United States Patent

Kaneko et al.

[15] 3,700,680
[45] Oct. 24, 1972

[54] AMINOALKANOL ESTERS AND THEIR PHARMACEUTICALLY ACCEPTABLE ACID-ADDITION SALTS

[72] Inventors: Hidehiko Kaneko, Minoo-shi, Osaka-fu; Jiro Aritomi, Nara-shi, Nara-ken; Keiji Nakamura, Neyagawa-shi, Osaka-fu, all of Japan

[73] Assignee: Dainippon Pharmaceutical Co., Ltd.

[22] Filed: Oct. 9, 1968

[21] Appl. No.: 766,297

[30] Foreign Application Priority Data

Oct. 13, 1967  Japan......................42/65896
Oct. 13, 1967  Japan......................42/65897

[52] U.S. Cl......260/295.5 R, 260/473 R, 260/476 R, 260/570.8 R, 424/266, 424/308
[51] Int. Cl..........................C07d 31/34, C07c 69/78
[58] Field of Search............260/295.5, 473 R, 476 R

[56] References Cited

UNITED STATES PATENTS 3,607,909  9/1971  Beregi et al............260/476 R
2,766,252  10/1956  Schlesinger.............260/295.5

OTHER PUBLICATIONS

Roberts et al., Basic Principles of Organic Chemistry, Benjamin Inc., pp. 531, 535, 563 and 659, QD251R58 (1965).

*Primary Examiner*—Alan L. Rotman
*Attorney*—Harry C. Bierman, Jordan B. Bierman and Bierman & Bierman

[57] ABSTRACT

Aminoalkanol esters of the formula:

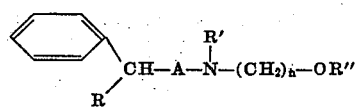

wherein R is hydrogen or phenyl, R' is hydrogen or alkyl having one to four carbon atoms, R" is acyl, A is ethylene or methylmethylene and $n$ is an integer of 2 or 3. The aminoalkanol esters and their pharmaceutically acceptable acid-addition salts are useful as medicaments for treatment of cardiovascular diseases.

10 Claims, No Drawings

AMINOALKANOL ESTERS AND THEIR PHARMACEUTICALLY ACCEPTABLE ACID-ADDITION SALTS

The present invention relates to aminoalkanol esters and their pharmaceutically acceptable acid-addition salts, and production thereof.

The said aminoalkanol esters are representable by the formula:

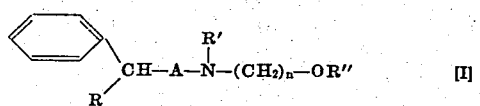
[I]

wherein R is hydrogen or phenyl, R' is hydrogen or alkyl having one to four carbon atoms (e.g. methyl, ethyl, propyl, isopropyl, butyl), R" is acyl, A is ethylene or methylmethylene and n is an integer of 2 or 3.

The term "acyl" hereinabove used is intended to mean the residue of a carboxylic acid (e.g. alkanoic acid, aromatic carboxylic acid, alicyclic carboxylic acid, heterocyclic carboxylic acid) excluding hydroxyl therefrom. The carboxylic acyl group may usually have up to 12 carbon atoms and the specific examples are as follows: lower alkanoyl (e.g. acetyl, propionyl, isopropionyl, butyryl), hydroxy-(lower)alkanoyl (e.g. hydroxyacetyl, β-hydroxypropionyl, γ-hydroxybutyryl), phenyl(lower)alkanoyl (e.g. phenylacetyl, β-phenylpropionyl), phenyl-hydroxy(lower)alkanoyl (e.g. α-hydroxy-α-phenylacetyl, α-hydroxy-β-phenylpropionyl), benzoyl, hydroxybenzoyl (e.g. 2-hydroxybenzoyl, 4-hydroxybenzoyl), lower alkylbenzoyl (e.g. 2-methylbenzoyl, 4-methylbenzoyl), lower alkoxybenzoyl (e.g. 4-methoxybenzoyl, 4-ethoxybenzoyl, 3,4-dimethoxybenzoyl, 3,4,5-trimethoxybenzoyl), halobenzoyl (e.g. 4-chlorobenzoyl, 4-bromobenzoyl, 4-fluorobenzoyl), cyclo(lower)alkanoyl (e.g. cyclopentanoyl, cyclohexanoyl), lower alkylcyclo(lower)alkanoyl (e.g. camphonanyl, 4-methylcyclohexanecarbonyl, 2,2,6-trimethylcyclohexanecarbonyl), pyridinecarbonyl (e.g. nicotinoyl), etc.

As the pharmaceutically acceptable acid-addition salt of the aminoalkanol ester [I], there may be exemplified the following salts: hydrochloride, sulfate, nitrate, acetate, propionate, oxalate, tartrate, malonate, malate, maleate, citrate, lactate, gluconate, aspartate, glycolate, methoxyacetate, phenylacetate, etc.

It has now been found that the aminoalkanol esters [I] and their pharmaceutically acceptable acid-addition salts generally and characteristically exhibit a variety of pharmacological activities such as coronary vasodilator activity, spasmolytic activity and hypotensive activity, which ensure their usefulness as medicaments for treatment of cardiovascular diseases. It is notable that the corresponding aminoalkanols have no practical potency in the said pharmacological activities.

Accordingly, a basic object of the present invention is to embody the novel aminoalkanol esters [I] and their pharmaceutically acceptable acid-addition salts. Another object of this invention is to embody the aminoalkanol esters [I] and their pharmaceutically acceptable acid-addition salts having pharmacological activities. A further object of the invention is to embody a process for preparing the aminoalkanol esters [I] and their pharmaceutically acceptable acid-addition salts. A still further object of the invention is to embody a process for preparing the aminoalkanol esters [I] and their pharmaceutically acceptable acid-addition pharmaceuticallyacceptable acid-addition salts. These and other objects will be apparent to those conversant with the art to which the present invention pertains from the subsequent description.

In accordance with the present invention, the aminoalkanol ester [I] is prepared by condensing a compound of the formula:

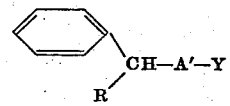

wherein R is as defined above, A' is methylenecarbonyl, ethylene or methylmethylene and Y is a group reactive with a group hereinafter represented by the symbol Z to leave a moiety of the formula:

in which R' is as defined above in the resulting product with a compound of the formula:

$$Z-(CH_2)n-OR''''$$

wherein n is as defined above, R'''' is hydrogen or acyl and Z is a group reactive with a group hereinbefore represented by the symbol Y to leave a moiety of the formula:

in which R' is as defined above in the resulting product; when A' is methylenecarbonyl, reducing the resulting product with a reducing agent; when R'''' is hydrogen, reacting the resulting product with an acylating agent; and, when R' is hydrogen, optionally reacting the resulting product with an alkylating agent.

Some of the concrete procedures fallen within the category of the above process are illustrated below.

Procedure 1

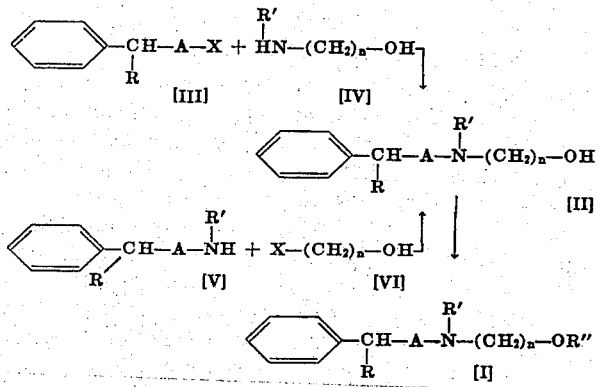

wherein R, R', R'', A and *n* are each as defined as above and X is halogen (e.g. chlorine, bromine).

As shown in the above scheme, the procedure consists of condensation and esterfication. The condensation may be carried out by reacting the alkyl halide [III] with the alcohol [IV] or the amine [V] with the alcohol [VI], preferably in a solvent (e.g. methanol, ethanol, benzene, toluene, xylene) at a temperature from 100° to 200° C, if needed, in a sealed tube or an autoclave. The reaction is normally accomplished within several hours. The esterfication may be effected by reacting the resultant aminoalkanol [II] or its acid-addition salt with an organic carboxylic acid or its reactive derivative such as acid halide, acid anhydride or acid lower alkyl ester, ordinarily in an inert solvent (e.g. benzene, toluene, xylene, chloroform) at a temperature from room temperature to 150° C. The reaction is usually accomplished within several to 20 hours. When the reagent is an organic carboxylic acid itself, the use of a dehydrating agent (e.g. hydrogen chloride, p-toluenesulfonic acid, dicyclohexylcarbodiimide) is required. When an organic carboxylic acid lower alkyl ester is employed as the reagent, the presence of an acidic catalyst (e.g. hydrogen chloride, p-toluenesulfonic acid) or a basic catalyst (e.g. sodium methoxide, sodium ethoxide) is essential.

wherein R, R', R'', A, *n* and X are each as defined above.

As shown in the above scheme, the procedure consists of condensation, reduction and esterification. The condensation may be accomplished by reacting the alkanoyl halide [VII] with the alcohol [IV] or the amide [VIII] with the alcohol [VI] in a solvent (e.g. chloroform, carbon tetrachloride), preferably in the presence of a base (e.g. triethylamine, pyridine) while cooling with ice for several hours. The subsequent reduction may be executed by treating the amide [IX] with a reducing agent conventionally employed for conversion of an amide carbonyl group into a methylene group (e.g. lithium aluminum hydride, borane) in an inert solvent (e.g. dioxane, diglyme, tetrahydrofuran), usually at a temperature from room temperature to 120° C. The reaction is ordinarily accomplished within several to 20 hours. The subsequent esterification may be carried out in the entirely same manner as described in the procedure 1.

Procedure 3

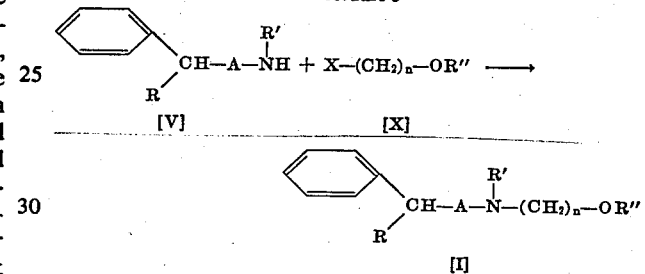

wherein R, R', R'', A, n and X are each as defined above.

As shown in the above scheme, the procedure consists of condensation. The condensation may be carried out by reacting the amine [V] with the ester [X], preferably in a solvent (e.g. methanol, ethanol, benzene, toluene, xylene) at a temperature from 100° to 200° C, if needed, in a sealed tube or an autoclave. The reaction is normally accomplished within several hours.

Procedure 2

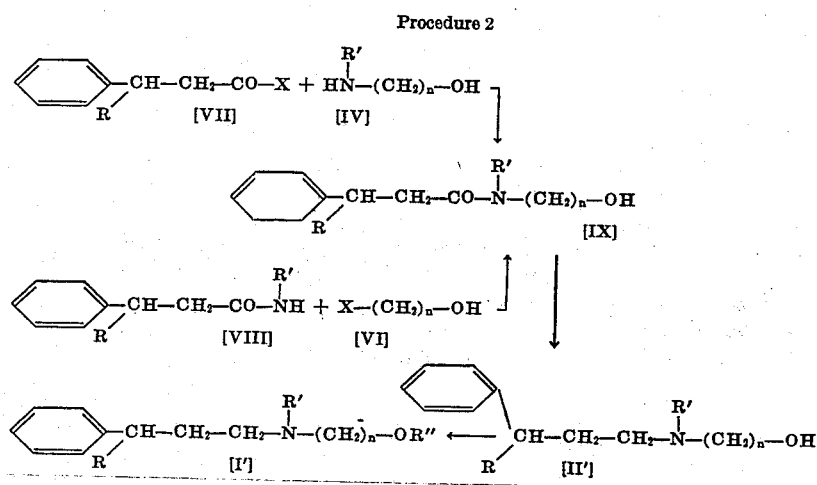

Procedure 4

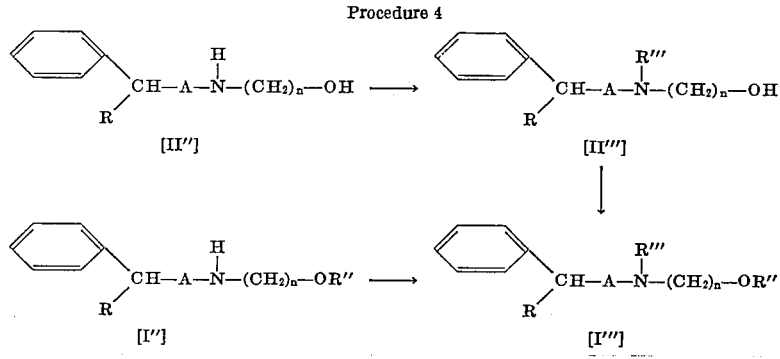

wherein R, R'', A and n are each as defined above and R''' is alkyl having one to four carbon atoms (e.g. methyl, ethyl, propyl, isopropyl, butyl).

As shown in the above scheme, the procedure consists of alkylation, followed or not by esterification. The alkylation may be executed by treating the aminoalkanol [II''] or the aminoalkanol ester [I''], both being prepared by either one of the procedures 1 to 3, with an alkylating agent (e.g. formic acid-formalin, alkyl iodide, dialkyl sulfate), usually at a temperature from 20° to 100° C. If necessary, a suitable solvent may be used depending on the kind of the alkylating agent. In the case of using formic acid-formalin, excess of formic acid serves as a solvent. When alkyl iodide is the reagent, acetone, methanol or ethanol are examples of the preferred solvent. For dialkyl sulfate, the reaction medium may be made of ether, chloroform, benzene or the like in an alkaline condition. The esterification to be subsequently performed when the resulting product is the aminoalkanol [II'''] may be effected in the entirely same manner as described in the procedure 1.

In the above procedures, the objective aminoalkanol ester [I] is obtained in the form of free base or acid-addition salt. When the product is in the salt form, it can be converted into the free base form by a conventional method, e.g. treatment of the former in chloroform with an aqueous solution of sodium carbonate. The treatment of the free base with an organic or inorganic acid (e.g. acetic acid, oxalic acid, malonic acid, tartaric acid, malic acid, citric acid, lactic acid, gluconic acid, aspartic acid, hydrochloric acid, sulfuric acid, nitric acid) in a suitable solvent (e.g. water, methanol, ethanol) affords the corresponding acid-addition salt.

As hereinbefore stated, the aminoalkanols [I] and their pharmaceutically acceptable acid-addition salts are useful as medicaments for treatment of cardiovascular diseases. Some of the test results by which such utility is confirmed are described below.

Test 1.

Coronary vasodilator activity:

A. On the isolated rat's heart [cf. Setnikar et al.: Archives internationales de Pharmacodynamie et de Therapie, 131, 187 (1961)]. The hearts isolated from Wister rats of about 250 g body weight were subjected to measurement of the coronary blood flow by the Langendorff method. The heart was perfused with Ringer-Locke solution, before which the test compound was given. The results are shown in Table 1.

Table 1

| Test compound | Coronary vasocilator activity | |
|---|---|---|
| | $ED_{20}$ 1) ($\gamma$) | $ED_{50}$ 2) ($\gamma$) |
| 2-(3,3-Diphenylpropylamino)-ethyl 3,4,5-trimethoxybenzoate (hydrochloride) | 13.8 | 30.0 |
| 3-(3,3-Diphenylpropylamino)-propyl 3,4-dimethoxybenzoate (hydrochloride) | 2.89 | 5.02 |
| 3-(3,3-Diphenylpropylamino)-propyl 3,4,5-trimethoxy-benzoate (hydrochloride) | 0.25 | 1.24 |
| 3-(2-Phenylisopropylamino)-propyl 3,4,5-trimethoxybenzoate (hydrochloride) | 9.12 | — |
| 3-[N-(3,3-Diphenylpropyl)-N-methylamino]propyl 3,4,5-trimethoxybebzoate (oxalate) | 11.4 | — |
| 2-[N-(3,3-Diphenylpropyl)-N-methylamino]ethyl acetate (oxalate) | 5.25 | — |
| 3-(3,3-Diphenylpropylamino)-propyl mandelate (d-tartrate) | 11.5 | 38.0 |
| 2-(3,3-Diphenylpropylamino)-ethyl benzoate (oxalate) | 3.63 | — |

Note: 1) Dose of test compound required for 20 % increase of coronary blood flow; 2) Dose of test compound required for 50 % increase of coronary blood flow.

B. On the isolated dog's heart [cf. Takenaka: Archiv fur Experimentelle Pathologie und Pharmakologie, 252, 407 (1966)]. The heart of a dog anesthetized with intravenous injection of pentobarbital sodium (30 mg/kg) was isolated and a glass cannula was inserted into each of the aorta and pulmonary artery. Another dog was anesthetized with intravenous injection of pentobarbital sodium (30 mg/kg) and drop phleoboclysis of physiological saline solution containing heparin, 10 % urethane and 1 % chloralose and served as a donor. A cannula was inserted into the common carotid artery of the donor animal and connected to the aortic cannula of the isolated heart. Perfusion pressure was measured with an electric manometer which was set between the carotid artery of the donor animal and the aortic cannula of the isolated heart. The coronary venous blood was allowed to flow out through the pulmonary artery cannula into a blood reservoir and returned to the femoral vein of the donor animal. Cardiac contractions were recorded with a strain gauge transducer, and electrocardiogram was recorded by direct insertion of an electrode into the isolated heart. On the donor animal, an electric manometer was set to the right femoral artery and the pressure was recorded. In the left femoral artery, a loop was formed and an electronic manometer was set to record the femoral blood flow. The test compound was given intracoronarily. From the resultant data, the change percent of the coronary blood flow, the perfusion pressure and the coronary vascular resistance were calculated. The results are shown in Table II.

Test 2.
Spasmolytic activity:

A. Anti-acetylcholine, anti-histamine and anti-BaCl$_2$ activities. The ileum of a male guinea pig of 300 to 400 g body weight was isolated and cut to make strips of 1.5 to 2 cm in length. The strip was suspended in Tyrod solution aerated and maintained at 28° C, and the contraction of the strip was recorded on a kymographion. One minute after administration of acetylcholine ($10^{-8}$ g/ml), histamine ($5 \times 10^{-8}$ g/ml) or BaCl$_2$ ($10^{-4}$ g/ml) and when the tonus rise became constant, the test compound was acted on the strip and the antagonistic action to the tonus rise was observed.

B. Anti-serotonine activity. The test was carried out according to the Goddum-Hameed method [Goddum et al.: British Journal of Pharmacology and Chemotherapy, 9, 240 (1954)]. A half horn of the uterus isolated from a Wister female rat of 150 to 200 g body weight was suspended in a 20 ml Magnus tube. Serotonin creatinate ($2 \times 10^{-8}$ g/ml) was administered at intervals of 7 minutes and, after the contraction was induced, the horn was washed three times with a nutrient medium having the following composition (g/L): NaCl 9.0, NaHCO$_3$ 0.5, KCl 0.42, CaCl$_2$ 0.06, MgCl$_2$ 0.0025, glucose 0.25. The test compound was given 5 minutes before administration of serotonin creatinate. The antagonistic action to contraction was observed.

C. Anti-nicotine activity. The intestinal canal isolated from a guinea pig was set as in the above 1) and nicotine ($2 \times 10^{-6}$ g/ml) was administered thereto so that contraction was induced. The test compound was given 5 minutes before administration of nicotine. The antagonistic action to contraction was observed.

D. Adrenergic neuron block activity. The vas deferens isolated from a guinea pig was suspended in a Locke solution aerated and maintained at 32° C. According to the Birmingham-Wilson method [Birmingham et al.: British Journal of Pharmacology and Chemotherapy, 21, 569 (1963)], an intermural stimulation (60 c/s, 1.5 V/cm, 10 sec.) was given, and the contraction of the vas deferens caused thereby was taken as an index.

The results of the above tests are shown in Table III.

TABLE III

| Test Compound | ED$_{50}$ ($\mu$g/ml) | | | | | |
|---|---|---|---|---|---|---|
| | anti-acetyl-choline activity | anti-histamine activity | anti-serotonin activity | anti-BaCl$_2$ activity | anti-nicotine activity | Adrenergic neuron block activity |
| 2-(3,3-Diphenyl-propylamino)- ethyl 3,4,5-trimethoxybenzoate (hydrochloride) | >1.0 | >1.0 | 0.2 | 6.2 | — | 7.2 |
| 3-(3,3-Diphenyl-propylamino)-propylbenzoate (hydrochloride) | 1.6 | 0.98 | >1.0 | 0.33 | 1.2 | — |
| 3-(3,3-Diphenyl-propylamino)-propyl 3,4-dimethoxybenzoate (hydrochloride) | >1.0 | 0.82 | >1.0 | 2.1 | 0.35 | — |
| 3-(3,3-Diphenyl-propylamino)-propyl 3,4,5-trimethoxy-benzoate (hydrochloride) | >1.0 | >1.0 | >1.0 | 0.56 | >1.0 | 0.52 |
| 3-(2-Phenylisopropylamino)-propyl 3,4,5-trimethoxybenzoate (hydrochloride) | >1.0 | >1.0 | >1.0 | 1.3 | 0.65 | 1.0 |
| 3-[N-(3,3-Diphenylpropyl)-N-methylamino]propyl 3,4,5-trimethoxybenzoate (oxalate) | >1.0 | 0.28 | 0.1 | 0.25 | 0.23 | 2.0 |
| 2-[N-(3,3-Diphenylpropyl)-N-methylamino[ethyl benzoate (oxalate) | 0.12 | >1.0 | 1.0 | 0.8 | 0.3 | >1.0 |
| 2-[N-(3,3-Diphenylpropyl)-N-methylamino]ethyl acetate (oxalate) | >1.0 | >1.0 | >1.0 | 5.0 | 1.0 | >1.0 |
| 3-(3,3-Diphenyl-propylamino)-propyl mandelate (d-tartrate) | >1.0 | >1.0 | >1.0 | 0.71 | — | — |

Test 3.
Hypotensive activity:

Both kidneys of Wistar male rats of about 250 g body weight were wrapped with silk cloths, and the animals received 1 % saline solution for about 1 month whereby hypertensive state was induced. Then, the animals were administered orally the test compound. Blood pressure was measured, and the depression percent was calculated [Page: The Journal of the American Medical Association, 113,2046 (1939)]. The results are shown in Table IV.

TABLE II

| Test compound | Dose ($\mu$g.) | Coronary blood flow (ml./min.) | | | Perfusion pressure (mm. Hg) | | | Coronary vascular resistance (mm. Hg/ml./min.) | | |
|---|---|---|---|---|---|---|---|---|---|---|
| | | Control | After administration | Change (percent) | Control | After administration | Change (percent) | Control | After administration | Change (percent) |
| 3-(3,3-diphenylpropylamino)propyl 3,4,5-trimethoxybenzoate (hydrochloride). | 10 | 35.8 | 41.5 | +14.5 | 40.3 | 42.8 | +5.9 | 1.03 | 1.03 | −8.8 |
| | 30 | 32.6 | 47.6 | +48.6 | 49.7 | 45.0 | −9.4 | 1.52 | 0.95 | −37.5 |
| | 100 | 31.9 | 44.3 | +43.8 | 57.3 | 49.2 | −16.8 | 1.80 | 1.11 | −38.3 |
| | 300 | 40.8 | 53.8 | +32.1 | 95.7 | 62.3 | −36.0 | 2.35 | 1.16 | −50.6 |
| 2-(3,3-diphenylpropylamino)ethyl 3,4,5-trimethoxybenzoate (hydrochloride). | 100 | 43.7 | 47.6 | +8.9 | 119 | 109 | −8.9 | 2.72 | 2.82 | −16.2 |
| | 300 | 44.9 | 47.3 | +16.8 | 112 | 98.3 | −12.5 | 2.49 | 2.08 | −16.5 |
| 3-(2-phenylisopropylamino) propyl 3,4,5-trimethoxybenzoate (hydrochloride). | 30 | 34.5 | 39.0 | +13.0 | 58.5 | 47.4 | −19.0 | 1.70 | 1.22 | −28.2 |
| | 100 | 39.0 | 41.4 | −6.2 | 49.3 | 44.1 | −10.5 | 1.26 | 1.07 | −15.1 |
| 2-[N-(3,3-diphenylpropyl)-N-methyl-amino] ethyl benzoate (oxalate). | 100 | 36.4 | 36.4 | 0 | 120 | 120 | 0 | 3.29 | 3.29 | 0 |
| | 300 | 37.6 | 41.4 | +10 | 121 | 107.5 | −11.1 | 3.22 | 2.60 | −19.3 |
| 2-[N-(3,3-diphenylpropyl)-N-methyl-amino]ethyl acetate (oxalate). | 100 | 36.4 | 36.4 | 0 | 110 | 110 | 0 | 3.02 | 3.02 | 0 |
| | 300 | 36.4 | 40.3 | +10.7 | 117 | 115 | −1.7 | 3.21 | 2.85 | −11.2 |

TABLE IV

| Test compound | Dose (mg.) | Time after administration (min.) | | | | | | | |
|---|---|---|---|---|---|---|---|---|---|
| | | 30 | | 60 | | 120 | | 180 | |
| 3-(3,3-diphenylpropylamino)-propyl 3,4-dimethoxybenzoate (hydrochloride) | 100 | −6.5 | (−6.0) | −1.3 | (−1.2) | 0 | (0) | −2.6 | (−2.5) |
| 3-(3,3-diphenylpropylamino)-propyl 3,4,5-trimethoxybenzoate (hydrochloride) | 10 | 0 | (0) | −6.25 | (−6.0) | −3.5 | (3.25) | −1.5 | (−1.5) |
| | 30 | −4.0 | (−3.9) | −8.6 | (−8.2) | −7.3 | (−7.2) | −3.0 | (−3.0) |
| | 100 | −11.3 | (−10.7) | −17.7 | (−17.0) | −13.7 | (−13.0) | −9.3 | (−9.0) |
| 3-(2-phenylisopropylamino)-propyl 3,4,5-trimethoxybenzoate (hydrochloride) | 100 | −4.3 | (−4.3) | −12.5 | (−12.0) | −6.8 | (−6.5) | −6.8 | (−6.3) |
| 2-[N-(3,3-diphenylpropyl)-N-methylamino]ethyl benzoate (oxalate) | 100 | −1.5 | (−1.2) | −1.1 | (−1.1) | −2.3 | (−2.2) | −7.4 | (−7.1) |
| 2-(3,3-diphenylpropylamino)-ethyl benzoate (oxalate) | 100 | −2.0 | (−2.0) | −5.0 | (−5.0) | −3.25 | (−3.25) | −13.75 | (−13.75) |
| | 500 | −12.3 | (−11.8) | −15.8 | (−15.3) | −30.5 | (−29.3) | −30.5 | (−29.2) |

NOTE.—The numerals not parenthesized represent the values about diastrolic blood pressure. The numerals parenthesized represent the values about systolic blood pressure.

The toxicity of the aminoalkanol esters [I] and their pharmaceutically acceptable acid-addition salts is considerably low. In the acute toxicity, for instance, the $LD_{50}$ values of these compounds when orally or subcutaneously administered to Wistar male rats and to ICR–JCL male mice were respectively more than 3,000 mg/kg and more than 2,000 mg/kg. Further, for instance, the $LD_{50}$ values of 3-(3,3-diphenylpropylamino)propyl 3,4,5-trimethoxybenzoate (hydrochloride) intravenously administered to Wistar male rats and to ICR–JCL male mice were respectively 31.5 mg/kg and 35.0 mg/kg.

The aminoalkanol esters [I] and their pharmaceutically acceptable acid-addition salts can be administered by conventional methods, conventional types of unit dosages or with conventional pharmaceutical carriers to produce a therapeutic effect for cardiovascular diseases in human beings and animals. Thus, they can be used in the form of pharmaceutical preparations, which contain them in admixture with a pharmaceutical organic or inorganic carrier material suitable for enteral or parenteral applications. Oral administration by the use of tablets, capsules, powders or in liquid form such as suspensions, solutions, emulsions or syrups is particularly advantageous. When formed into tablets, conventional excipients (e.g. sodium citrate, lactose, microcrystalline cellulose, starch), lubricating agents (e.g. anhydrous silicic acid, hydrized castor oil, magnesium stearate, sodium lauryl sulfate, talc) and binding agents (e.g. starch paste, glucose, lactose, gum acacia, gelatin, mannitol, magnesium trisilicate, talc) used in therapeutic unit dosages can be employed. When administered as liquids, conventional liquid carriers can be used. For intravenous or intramuscular injection, those in acid-addition salt form, particularly hydrochlorides, are employed after dissolving in water, if necessary, followed by buffering or making isotonic with glucose, saline or the like.

The unit dosage or therapeutically effective quantity of the aminoalkanol esters [I] and their pharmaceutically acceptable acid-addition salts for human beings can vary over wide limits such as that of about 0.1 to about 50 mg. It is indicated from animal experiments that about 0.5 to about 20 mg, more preferably about 2 to about 6 mg, of the therapeutic agent per kg of body weight is a suitable daily dose for human adult. The dosage of the particular therapeutic agent used can vary considerably, such as the age of the patient and the degree of therapeutic effect desired. In the case of solid preparations, each unit dosage form of the therapeutic agent can contain from about 5 to about 95 % of the same by weight of the entire composition with the remainder comprising conventional pharmaceutical carriers. When the therapeutic agent is used an aqueous solution, i.e. injection, the soution may contain about 0.05 to about 0.5 % of the same by weight of the entire solution. Of course, it is possible to administer the therapeutic agent, i.e. the pure compound, without the use of any pharmaceutical carrier.

Practical and presently preferred embodiments of the present invention are illustratively shown in the following Examples.

Example 1.

A. In a sealed tube, a mixture of 1-chloro-3,3-diphenylpropane (2.5 g), 3-aminopropan-1-ol (1.0 g) and ethanol (20 ml) is heated at 130° C for 6.5 hours. After removal of the ethanol from the reaction mixture, the residue is dissolved in benzene, washed with water and extracted with 5 % hydrochloric acid and water in order. The washing water, the hydrochloric acid extract and the water extract are combined together, made alkaline with sodium hydroxide and extracted with benzene. The benzene extract is washed with water, dired over anhydrous sodium sulfate and concentrated to give 3-(3,3-diphenylpropylamino)propan-1-ol (2.5 g). M.P. 88° to 90° C.

The starting 1-chloro-3,3-diphenylpropane is prepared as follows: 3,3-diphenylpropan-1-ol (13.8 g) is dissolved in benzene (40 ml), admixed with thionyl chloride (20 g) and refluxed for 1 hour; excess of thionyl chloride is distilled off; and the resultant is distilled under reduced pressure to give an oil (12.0 g) boiling at 146° to 147° C/4 mmHg.

B. In a sealed tube, a mixture of 3,3-diphenylpropylamine (5 g), 3-chloropropan-1-ol (1.6 g) and ethanol (20 ml) is heated at 130° C for 8 hours. The reaction mixture is treated as in (A) to give 3-(3,3-diphenylpropylamino)-propan-1-ol (3 g).

Example 2.

A. A mixture of 2-(3,3-diphenylpropylamino)-ethan-1-ol hydrochloride (1.5 g), 3,4,5-trimethoxybenzoic acid (1.0 g) and p-toluenesulfonic acid (2 g) in benzene (20 ml) is refluxed for 15 hours. After cooling, the reaction mixture is washed with 5 % sodium carbonate solution and 10 % hydrochloric acid, dried over anhydrous sodium sulfate and concentrated. The residue is admixed with an ethanolic solution of hydrochloric acid and concentrated under reduced pressure. The residue is crystallized from a mixture of ethanol and ether to give 2-(3,3-diphenylpropylamino)ethyl 3,4,5-trimethoxybenzoate hydrochloride (0.75 g). M.P. 172° to 173° C.

B. 3-(3,3-Diphenylpropylamino)propan-1-ol hydrochloride (1.5 g), benzoic acid (1.0 g) and p-toluenesulfonic acid (2.0 g) are added to benzene (20 ml), and the resultant mixture is treated as in (A). The obtained crude crystals are recrystallized from ethanol to give 3-(3,3-diphenylpropylamino)propyl benzoate hydrochloride (1.5 g). M.P. 178° to 180° C.

C. 3-(3,3-Diphenylpropylamino)propan-1-ol (1.5 g), 3,4-dimethoxybenzoic acid (1.0 g) and p-toluenesulfonic acid (2.0 g) are added to toluene (20 ml), and the resultant mixture is treated as in (A) to give 3-(3,3-diphenylpropylamino)propyl 3,4-dimethoxybenzoate hydrochloride (1.5 g). M.P. 137° to 138° C.

In the above procedure, the use of p-hydroxybenzoic acid in place of 3,4-dimethoxybenzoic acid affords 3-(3,3-diphenylpropylamino)propyl p-hydroxybenzoate hydrochloride. M.P. 131° to 134° C.

D. 3-(3,3-Diphenylpropylamino)propan-1-ol (1.3 g), 3,4,5-trimethoxybenzoic acid (1.0 g) and p-toluenesulfonic acid (2.0 g) are added to benzene (20 ml), and the resultant mixture is treated as in (A) to give 3-(3,3-diphenylpropylamino)propyl 3,4,5-trimethoxybenzoate hydrochloride (1.5 g). M.P. 145° to 147° C.

The hydrochloride is dissolved in chloroform. The resultant solution is washed with sodium carbonate solution and concentrated to give 3-(3,3-diphenylpropylamino)propyl 3,4,5-trimethoxybenzoate, which is treated with an aqueous or ethanolic solution of an acid to give the corresponding acid-addition salt. Some examples of the acid- addition salts thus obtained are as follows: oxalate, M.P. 179° to 181° C; malonate, M.P. 140° to 143° C; dl-malate, M.P. 91° to 94° C; d-tartrate, M.P. 54° to 60° C; citrate, M.P. 61° to 66° C; dl-lactate, extremely low melting point; gluconate, extremely soluble in water, not crystallized; aspartate, extremely soluble in water, not crystallized; acetate, not crystallized; nitrate, M.P. 139° to 140° C, sulfate, extremely hygroscopic.

E. 2-(3,3-Diphenylpropylamino)ethan-1-ol (1.5 g), p-chlorobenzoic acid (1.0 g) and p-toluenesulfonic acid (2 g) are added to chloroform (20 ml), and the resultant mixture is treated as in (A) to give 2-(3,3-diphenylpropylamino)ethyl p-chlorobenzoate hydrochloride (0.5 g).

In the similar manner, 3-(3,3-diphenylpropylamino)propyl p-fluorobenzoate hydrochloride is prepared from 3-(3,3-diphenylpropylamino)propan-1-ol and p-fluorobenzoic acid. M.P. 221° to 223° C.

F. 3-(2-Phenylisopropylamino)propan-1-ol (2.5 g), 3,4,5-trimethoxybenzoic acid (2.5 g) and p-toluenesulfonic acid (5.0 g) are added to benzene (20 ml), and the resultant mixture is treated as in (A) to give 3-(2-phenylisopropylamino)propyl 3,4,5-trimethoxybenzoate hydrochloride (2.6 g). M.P. 138° to 141° C.

G. 2-[N-(3,3-Diphenylpropyl)-N-methylamino]ethan-1-ol hydrochloride (1.5 g), 3,4,5-trimethoxybenzoic acid (1.0 g) and p-toluenesulfonic acid (2 g) are added to benzene (20 ml), and the resultant mixture is treated as in (A) to give 2-[N-(3,3-diphenylpropyl)-N-methylamino]ethyl 3,4,5-trimethoxybenzoate hydrochloride (0.8 g). M.P. 135° to 137° C.

In the similar manner, 3-[N-(3,3-diphenylpropyl)-N-methylamino]propyl 3,4,5-trimethoxybenzoate hydrochloride is prepared from 3-[N-(3,3-diphenylpropyl)-N-methylamino]-propan-1-ol and 3,4,5-trimethoxybenzoic acid. The hydrochloride is dissolved in chloroform, washed with sodium carbonate solution, dried and concentrated. The residue is admixed with an ethanolic solution of oxalic acid to give the oxalate. M.P. 164° to 165° C.

H. To a solution of 2-[N-(3,3-diphenylpropyl)-N-methylamino]ethan-1-ol (2.0 g) in chloroform, there is added benzoyl chloride (1.5 g), and the resultant mixture is stirred at room temperature for 0.5 hour and heated while refluxing for 1.5 hours. The reaction mixture is admixed with water to decompose excess of benzoyl chloride. The chloroform layer is separated, washed with 10 % sodium carbonate solution and water, dried over anhydrous sodium sulfate and concentrated to give 2-[N-(3,3-diphenylpropyl)-N-methylamino]ethyl benzoate (2.5 g) as oil. The oil is dissolved in ethanol, admixed with an ethanolic solution of oxalic acid and allowed to stand to give the oxalate. M.P. 144° to 146° C. The use of an ethanolic solution of d-tartaric acid in place of an ethanolic solution of oxalic acid affords the d-tartrate. M.P. 101° to 105° C.

In the similar manner, 3-[N-(3,3-diphenylpropyl)-N-methylamino]propyl benzoate is prepared from 3-[N-(3,3-diphenylpropyl)-N-methylamino]propan-1-ol and benzoyl chloride.

I. A mixture of 2-[N-(3,3-diphenylpropyl)-N-methylamino]ethan-1-ol (1.9 g) and acetic anhydride (10 ml) is heated at 140° C for 2 hours. After cooling, the reaction mixture is admixed with water (50 ml), made alkaline with sodium carbonate and shaken with benzene. The benzene layer is washed with water, dried over anhydrous sodium sulfate and concentrated to give 2-[N-(3,3-diphenylpropyl)-N-methyl-amino]ethyl acetate (2.1 g). The compound is dissolved in a small amount of ethanol, admixed with an ethanolic solution of oxalic acid and allowed to stand to give the oxalate. M.P. 140° to 142° C.

In the similar, 3-[N-(3,3-diphenylpropyl)-N-methylamino]propyl acetate is prepared from 3-[N-(3,3-diphenyl-propyl)-N-methylamino]propan-1-ol and acetic anhydride.

J. A mixture of 3-(3,3-diphenylpropylamino)-propan-1-ol (10 g), methyl dl-mandelate (10 g) and sodium p-toluenesulfonate monohydrate (25 g) in benzene (200 ml) is refluxed on a water bath for 13 hours. After cooling, the reaction mixture is washed with dilute hydrochloric acid, water and sodium carbonate solution in order, dried over anhydrous sodium sulfate and concentrated. The resulting oil is admixed with an ethanolic solution of oxalic acid to give 3-(3,3-diphenylpropylamino)propyl dl-mandelate oxalate (13.0 g). M.P. 130° to 131° C. The use of an ethanolic solution of d-tartaric acid in place of an ethanolic solution of oxalic acid affords the d-tartrate, M.P. 182° to 184° C.

K. A mixture of 3-(3,3-diphenylpropylamino)-propan-1-ol (2.7 g), nicotinic acid (1.4 g), p-toluenesulfonic acid (5.4 g) and benzene (40 ml) is heated on a water bath for 24 hours. After cooling, the reaction mixture is washed with 15 % sodium carbonate solution and shaken with 10 % hydrochloric acid. The aqueous layer is made alkaline with sodium carbonate and shaken with chloroform. The chloroform layer is dried over anhydrous sodium sulfate and concentrated. The residue is dissolved in a small amount of chloroform and subjected to chromatography on silica gel. The eluate is admixed with an ethanolic solution of oxalic acid, and the precipitate is crystallized from ethanol to give 3-(3,3-diphenylpropylamino)propyl nicotinate oxalate (1.5 g). M.P. 173° to 175° C (decomp.).

L. A mixture of 3-(3,3-diphenylpropylamino)-propan-1-ol (2.7 g), naphtenic acid (1.4 g) and p-toluenesulfonic acid (5.1 g) in benzene (20 ml) is refluxed for 13 hours. After cooling, the reaction mixture is washed with 15 % sodium carbonate solution, 10 % hydrochloric acid and 15 % sodium carbonate solution in order, dried over anhydrous sodium sulfate and concentrated. The residual oil is admixed with an ethanolic solution of oxalic acid, and the precipitated crystals are recrystallized from ethanol to give 3-(3,3-diphenylpropylamino)propyl naphthenate oxalate (2.0 g). M.P. 158° to 163° C.

M. A mixture of 2-(3,3-diphenylpropylamino)ethan-1-ol hydrochloride (1.5 g), benzoic acid (1.0 g) and p-toluenesulfonic acid (2 g) in benzene (20 ml) is refluxed for 16 hours. After cooling, the benzene layer is separated, washed with 5 % sodium carbonate solution, 10 % hydrochloric acid and 5 % sodium carbonate solution in order, dried over anhydrous sodium sulfate and concentrated under reduced pressure. The residue is admixed with an ethanolic solution of oxalic acid, and the precipitated crystals are collected and recrystallized from water to give 2-(3,3-diphenylpropylamino)-ethyl benzoate oxalate (1 g). M.P. 193° to 195° C.

Example 3.

A mixture of 3,3-diphenylpropionic acid (45 g) in thionyl chloride (40 ml) is refluxed for 2 hours to remove excess of thionyl chloride. The obtained 3,3-diphenylpropionyl chloride is dissolved in chloroform (100 ml), and the resultant solution is dropwise added to a cooled mixture of ethanolamine (30 g), triethylamine (35 g) and chloroform (150 ml) while stirring. The reaction mixture is allowed to stand overnight. The precipitate is collected by filtration, washed with water and recrystallized from benzene (100 ml) to give 2-(3,3-diphenylpropionylamino)ethan-1-ol (31.5 g). M.P. 91° to 93° C.

To a suspension of lithium aluminum hydride (4.5 g) in dioxane (100 ml), a solution of 2-(3,3-diphenylpropionylamino)ethan-1-ol (10 g) in dioxane (30 ml) is dropwise added, and the resultant mixture is stirred at room temperature for 2 hours and refluxed for 12 hours. To the reaction mixture cooled with ice, there is dropwise added water (9 ml), and the resulting mixture is warmed for 1 hour. The precipitate is collected by filtration and washed with dioxane. The filtrate and the washing dioxane are combined and concentrated under reduced pressure to give 2-(3,3-diphenylpropylamino)-ethan-1-ol (9.5 g). M.P. 74 to 76° C. The compound is admixed with an ethanolic solution of hydrochloric acid and concentrated under reduced pressure to give the hydrochloride. M.P. 154.5° to 155.5° C.

In the similar manner, 3-(3,3-diphenylpropylamino)-propan-1-ol is obtained from 3-(3,3-diphenyl-propionylamino-propan-1-ol prepared by reacting 3,3-diphenylpropionyl chloride with 3-aminopropan-1-ol. M.P. 88° to 90° C. The hydrochloride, M.P. 141.5° to 143.5° C.

Example 4.

A solution of 3,3-diphenylpropylamine (2.0 g) and 3-chloropropyl benzoate (1.9 g) in xylene (8 ml) is heated at 130° C for 4 hours. After cooling, chloroform (20 ml) is added. The mixture is washed with dilute hydrochloric acid and water to remove the starting amine, dried over anhydrous sodium sulfate and concentrated to give 3-(3,3-diphenylpropylamino)propyl benzoate hydrochloride (2.5 g). M.P. 178° to 180° C.

Example 5.

A. To a solution of 3-(3,3-diphenylpropylamino)-propan-1-ol (1.0 g) in formic acid (2.5 ml), 37 % formalin (2 ml) is added, and the resultant mixture is heated on a water bath for 5 hours. After addition of water (20 ml), the reaction mixture is made alkaline with sodium carbonate and shaken with benzene. The benzene layer is washed with saturated sodium chloride solution, dried over anhydrous sodium sulfate and concentrated. The residue is admixed with an ethanolic solution of hydrochloric acid and concentrated under reduced pressure. The residue is dissolved in acetone, admixed with ether and allowed to stand. The precipitated crystals are collected by filtration to obtain 3-[N-(3,3-diphenylpropyl)-N-methylamino]propan-1-ol hydrochloride (0.9 g). M.P. 95° to 102° C.

B. A mixture of 3-(3,3-diphenylpropylamino)propan-1-ol (1.5 g) and methyl iodide (1.5 g) in ethanol (6 ml) is heated on a water bath while refluxing for 1 hour. After removal of the solvent, the crystalline residue is recrystallized from ethanol to give 3-[N-(3,3-diphenylpropyl)-N-methylamino]propan-1-ol hydroiodide (0.9 g). M.P. 182° to 184° C.

C. To a solution of 2-(3,3-diphenylpropylamino)-ethan-1-ol (2.0 g) in formic acid (7 ml), formalin (7 ml) is added, and the resultant mixture is heated on a water bath for 3 hours. After cooling, the reaction mixture is admixed with water (20 ml), made alkaline with sodium carbonate and shaken with benzene. The benzene layer is washed with water, dried over anhydrous sodium sulfate and concentrated. The residue is admixed with an ethanolic solution of hydrochloric acid and concentrated. The residue is crystallized from a mixture of acetone and ether to give 2-[N-(3,3-diphenylpropyl)-N-methylamino]ethan-1-ol hydrochloride (2.1 g). M.P. 132° to 134° C.

D. To a solution of 3-(3,3-diphenylpropylamino)-propyl 3,4,5-trimethoxybenzoate (1.7 g) in formic acid (3 ml), there is added formalin (3 ml), and the resultant mixture is heated on a water bath for 5 hours. The reaction mixture is admixed with water (30 ml), made alkaline with sodium carbonate and shaken with benzene. The benzene layer is washed with water, dried over anhydrous sodium sulfate and concentrated to give 3-[N-(3,3-diphenylpropyl)-N-methylamino]propyl 3,4,5-trimethoxybenzoate (1.7 g).

Example 6.

Fine powder of 3-(3,3-diphenylpropylamino)propyl 3,4,5-trimethoxybenzoate hydrochloride (250 g), lactose (350 g), purified microcrystalline cellulose (300 g), corn starch (50 g), anhydrous silicic acid (10 g), magnesium stearate (20 g) and hydrized castor oil (20 g) are uniformly mixed and tableted in a conventional manner to make 10,000 tablets (each weighing 100 mg), followed by sugar coating. Each of the sugar coated tablets thus prepared contains 25 mg of the active ingredient.

Example 7.

3-(3,3-Diphenylpropylamino)propyl 3,4,5-trimethoxybenzoate hydrochloride (4 g) is dissolved in distilled water (1,000 ml) and filtered. Each 2 ml of the solution is filled in an ampoule, which is then sterilized at 121° C for 20 minutes. Each of the ampoules thus obtained contains 8 mg of the active ingredient.

Example 8.

3-(3,3-Diphenylpropylamino)propyl 3,4,5-trimethoxybenzoate hydrochloride (10 g) is dissolved in distilled water (2,500 ml), and physiological saline solution (17,500 ml) is added thereto. After filtration, each 100 ml of the solution is filled in an ampoule, which is then sterilized at 121° C for 20 minutes. Each of the ampoules thus obtained contains 50 mg of the active ingredient.

What is claimed is:

1. An aminoalkanol ester of the formula:

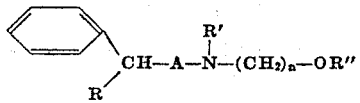

wherein R is hydrogen or phenyl, R' is hydrogen or alkyl having one to four carbon atoms, R'' is cyclic acyl selected from the group consisting of 3,4,5-trimethoxybenzoyl, 3,4-di-methoxybenzoyl, benzoyl, α-hydroxybenzoyl and nicotinoyl, A is ethylene or methylmethylene and $n$ is an integer of 2 or 3, or a pharmaceutically acceptable acid addition salt thereof.

2. The aminoalkanol ester according to claim 1 wherein R is phenyl, R' is hydrogen, R'' is 3,4,5-trimethoxybenzoyl, A is ethylene and $n$ is 3, or a pharmaceutically acceptable acid addition salt thereof.

3. The aminoalkanol ester according to claim 1 wherein R is phenyl, R' is hydrogen, R'' is 3,4,5-trimethoxybenzoyl, A is ethylene and $n$ is 2, or a pharmaceutically acceptable acid addition salt thereof.

4. The aminoalkanol ester according to claim 1 wherein R is phenyl, R' is hydrogen, R'' is 3,4-dimethoxybenzoyl, A is ethylene and $n$ is 3, or a pharmaceutically acceptable acid addition salt thereof.

5. The aminoalkanol ester according to claim 1 wherein R is hydrogen, R' is hydrogen, R'' is 3,4,5-trimethoxybenzoyl, A is methylmethylene and $n$ is 3, or a pharmaceutically acceptable acid addition salt thereof.

6. The aminoalkanol ester according to claim 1 wherein R is phenyl, R' is methyl, R'' is 3,4,5-trimethoxybenzoyl, A is ethylene and $n$ is 3, or a pharmaceutically acceptable acid addition salt thereof.

7. The aminoalkanol ester according to claim 1 wherein R is phenyl, R' is methyl, R'' is benzoyl, A is ethylene and $n$ is 2, or a pharmaceutically acceptable acid addition salt thereof.

8. The aminalkanol ester according to claim 1 wherein R is phenyl, R' is hydrogen, R'' is α-hydroxybenzoyl, A is ethylene and $n$ is 3, or a pharmaceutically acceptable acid addition salt thereof.

9. The aminoalkanol ester according to claim 1 wherein R is phenyl, R' is hydrogen, R'' is nicotinoyl, A is ethylene and $n$ is 3, or a pharmaceutically acceptable acid addition salt thereof.

10. The aminoalkanol ester according to claim 1 wherein R is phenyl, R' is hydrogen, R'' is benzoyl, A is ethylene and $n$ is 2, or a pharmaceutically acceptable acid addition salt thereof.

* * * * *